United States Patent
Marmonier

(10) Patent No.: US 8,755,155 B2
(45) Date of Patent: Jun. 17, 2014

(54) DEVICE AND A METHOD FOR PROTECTING A LINK IN A MEDIUM, HIGH, OR VERY HIGH VOLTAGE ELECTRICAL NETWORK

(75) Inventor: Jean Marmonier, Saint Aunes (FR)

(73) Assignees: Schneider Electric Protection & Contrôle SA, Lattes (FR); ALSTOM Grid Protection & Contrôle SAS, La defense (FR)

( * ) Notice: Subject to any disclaimer, the term of this patent is extended or adjusted under 35 U.S.C. 154(b) by 465 days.

(21) Appl. No.: 13/122,866

(22) PCT Filed: Oct. 5, 2009

(86) PCT No.: PCT/EP2009/062903
§ 371 (c)(1),
(2), (4) Date: Aug. 29, 2011

(87) PCT Pub. No.: WO2010/040713
PCT Pub. Date: Apr. 15, 2010

(65) Prior Publication Data
US 2011/0299199 A1 Dec. 8, 2011

(30) Foreign Application Priority Data
Oct. 7, 2008 (FR) ...................................... 08 56793

(51) Int. Cl.
*H02H 3/00* (2006.01)
(52) U.S. Cl.
USPC ............................................................ 361/1
(58) Field of Classification Search
USPC ............................................................ 361/1
See application file for complete search history.

(56) References Cited

U.S. PATENT DOCUMENTS

| 3,696,296 A | 10/1972 | Nylen |
| 5,775,955 A | 7/1998 | Graube et al. |
| 6,324,063 B1 | 11/2001 | Mohler |
| 2004/0252421 A1 | 12/2004 | Knox, Jr. et al. |

FOREIGN PATENT DOCUMENTS

| EP | 0 369 916 A1 | 5/1990 |
| EP | 1 640 825 A1 | 3/2006 |
| FR | 2 062 734 | 6/1971 |
| FR | 2 202 378 | 5/1974 |
| GB | 1 574 205 | 9/1980 |

OTHER PUBLICATIONS

French Search Report issued Jun. 2, 2009, in Patent Application No. FR 0856793 (with English Translation of Category Cited Documents).
International Search Report issued Jan. 20, 2010, in Patent Application No. PCT/EP2009/062903.

*Primary Examiner* — Rexford Barnie
*Assistant Examiner* — Tien Mai
(74) *Attorney, Agent, or Firm* — Oblon, Spivak, McClelland, Maier & Neustadt, L.L.P.

(57) ABSTRACT

A device and method of protecting a link in a medium, high, or very high voltage power network, with current and voltage transformers and trip circuits being disposed on the link. The protection device includes a mechanism to directly connect to a power supply, to the current and voltage transformers, and to the trip circuits, via analog links, and a mechanism to convert from analog to digital that is connected to a central processor unit via a digital link, the analog-digital conversion mechanism including an integrated test plug socket function.

15 Claims, 15 Drawing Sheets

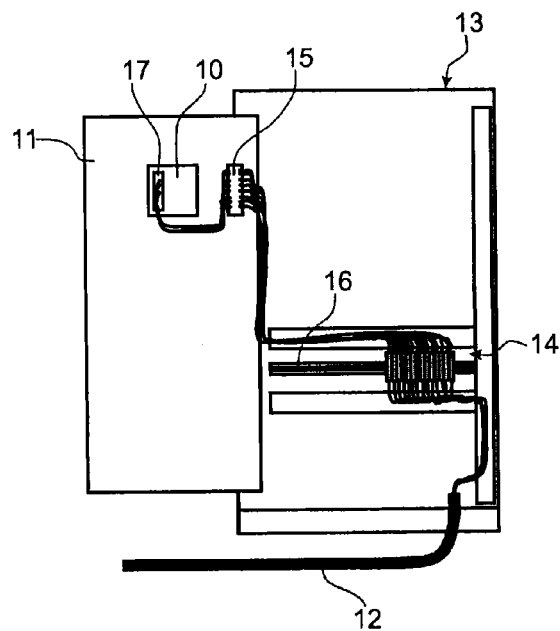
FIG.1
PRIOR ART
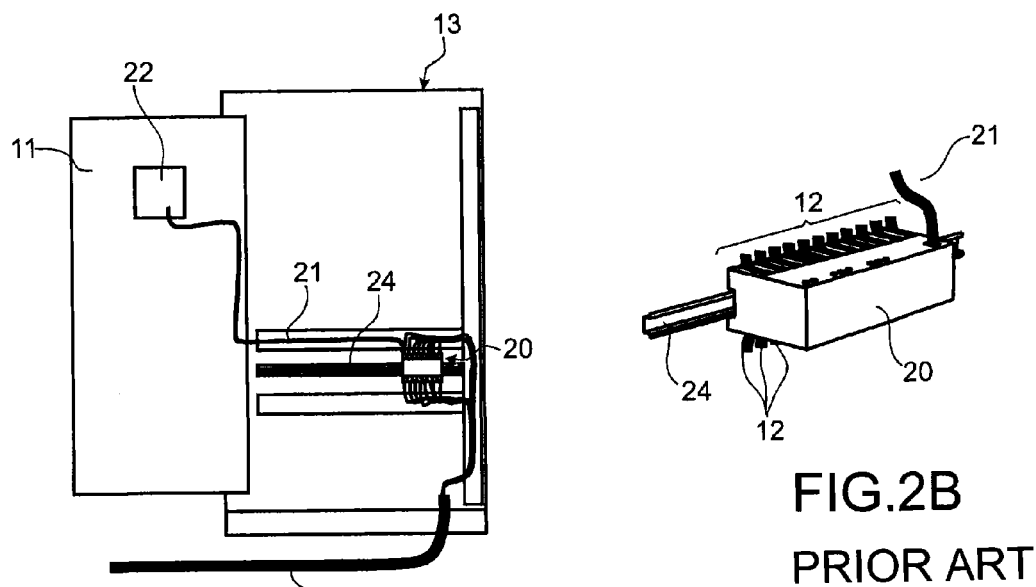
FIG.2A
PRIOR ART
FIG.2B
PRIOR ART

DEVICE AND A METHOD FOR PROTECTING A LINK IN A MEDIUM, HIGH, OR VERY HIGH VOLTAGE ELECTRICAL NETWORK

TECHNICAL FIELD

This invention relates to a device and a method for protecting a link in a medium, high, or very high voltage electrical network.

CURRENT STATE OF THE PRIOR ART

The field of the invention is that of devices for protecting electrical circuits and, more precisely, devices for protecting links (such as overhead power lines, overhead and underground links or cables, transformer feeds, motors etc. . . . ) in medium, high, or very high voltage networks.

The purpose of such protection devices is to measure continuously the secondary current and voltage delivered by current and voltage transformers that are installed on the medium, high, or very high voltage conductors.

The electrical data is taken in analog format on a plurality of transformers disposed in the network, and is then transmitted to the protection device through low voltage cables, before finally being converted to digital format within the protection devices.

Such protection devices make use of computer programs to compare, at any given instant, the measured electrical data with reference data appropriate to a predetermined electrical scheme.

In the event that a fault is detected by the protection device, the device gives an order to open or close interrupters or circuit breakers in order to make the network safe.

All of the analog data transmitted in this way typically passes through a test interface box. Such a test box enables the protection functions to be tested. The test box must be so designed that it ensures total safety in the operations of connecting and disconnecting the associated test socket, so as to avoid any accidental tripping of the interrupters or circuit breakers, or any danger to the operator.

In a typical form of apparatus, shown in FIG. 1, the protection device, or relay, 10 is installed on the door or pivoting frame 11 of an electricity cabinet 13. The low voltage cables 12 that deliver the data taken from the current and voltage transformers, and that also convey the trip orders to the circuit breakers, are typically brought in through the bottom of the cabinet 13. They are connected on an intermediate terminal block 14, having terminals that, in this example, are mounted on a standard DIN rail 16. The terminal block 14 is connected to a test box 15, which is itself connected at the rear to the protection relay 10 through separable (two-part) connectors 17.

As shown in FIGS. 2A and 2B, a version in which current and voltage acquisition is offset to the DIN rail enables wiring costs to be significantly reduced, because the protection relay, or central processor unit, 22, is wired directly to an offset acquisition unit 20. This acquisition unit 20, which performs the analog to digital conversion, is mounted on a DIN rail 24. It receives current and voltage through a direct connection to the cables 12 (analog links) at the voltage of the power supply, to the current and voltage transformers, and to the trip circuits, so as to transmit them via a digital link 21 to the central processor unit 22, which monitors the current and voltage and takes the decision to trip in response to which it gives a trip order to a circuit breaker. In its front face, the unit 22 may have the interface for communication with the operator (i.e. a display of measured current and voltage values, having regard to events taking place during a tripping process; a keypad for programming the device; etc. . . . ). The unit 22 may also be integrated in the acquisition unit 20.

A version of the above kind gives a large cost saving, both as regards the equipment itself and from the point of view of wiring-up time; it also improves the reliability of operation, because the number of electrical connections is reduced. However, such an arrangement does have the disadvantage that it makes it impossible to carry out functional testing of the protection system.

Such functional tests are traditionally performed by means of a test box as described above and in the document referenced [1] at the end of this description. In normal operation, a test box of this kind ensures the continuity of the current, voltage, and test circuits. Then a test socket is inserted, the insertion movement opens the trip circuit (so that the protection relay is no longer able to send a trip order to the circuit breaker); it then short-circuits the current circuits in order to avoid any opening of the current circuit, since any such opening involves, among other things, the danger of giving the operator an electric shock; and finally the insertion movement causes the protection device to be insulated from the current and voltage circuits. By connecting a current and voltage injector device to the test socket, via wiring, it is then possible to test the working of the relay while it is isolated from the current and voltage transformers and without causing any tripping of the circuit breaker.

In the arrangement shown in FIG. 2, such functional tests of the protection relay 22 by secondary injection cannot be carried out, because it is not possible to insert a test box between the protection relay 22 and the current transformer and voltage transformer circuits, since the wiring is direct by definition.

An object of the invention is to provide a device and a method that solve this problem, in such a way as to enable the decentralized acquisition unit to be replaced in the event of failure, and to enable functional tests to be performed with secondary injection.

SUMMARY OF THE INVENTION

The invention provides a device for protecting a link, for example a three-phase link, in a medium, high, or very high voltage electrical network, with current and voltage transformers and trip circuits being disposed on said link, the device including both connection means for direct connection to a power supply, to the current and voltage transformers, and to the trip circuits via analog links, and analog to digital conversion means connected via a digital link to a central processor unit, the device being characterized in that it includes:
 a base part connected to the supply voltage, to the current and voltage transformers, and to the trip circuits;
 an active part having at least one socket being adapted to be inserted in the base part; and
 a test part for enabling current and voltage to be injected and adapted to be inserted in a socket of the active part.

The active part may be connected to the central processor unit via a digital link. However, it should be noted that, if miniaturization permits, the central unit may be integrated into an offset acquisition unit, which eliminates the digital link. The central unit may thus be integrated in the active part.

Advantageously, the socket of the active part may be a contactless socket, or it may have two contacts for sharing the power supply of the active part. The device of the invention may with advantage have plugs adapted to be inserted in the test part.

In a first embodiment, the base part is fixed to a DIN rail or to any known fastening system.

In a second embodiment, the active part is rack-mounted or housed inside a metal panel of the front face of a cabinet. The device of the invention, in this second embodiment, is able, at the same time, both to serve as a test box and to have a disconnecting (unplugging) function.

The link may be a three-phase link, with a current transformer, a voltage transformer, and a trip circuit disposed in each phase.

The device of the invention presents the following numerous advantages:

Reduction in Cost of Equipment

In the first embodiment of the device of the invention, with a DIN rail as illustrated in FIGS. 4A to 5D, the proposed arrangement enables the intermediate terminal block 14 and the test box 15 to be replaced by the connector means of the base part 31 of the device of the invention.

In the second embodiment of the device of the invention, with rack mounting (as a withdrawable module), as shown in FIGS. 9A to 9D, the proposed arrangement enables the test box situated between the interface terminal block and the protection device to be eliminated.

Reduction of Wiring Cost

If we consider a typical relay for receiving currents in three phases and voltages in three phases, and having three trip circuits:

The prior art arrangement shown in FIG. 1 calls for 78 connection points. In addition, the wiring between the intermediate terminal block 14 and test socket, which is often installed on a pivoting frame, is difficult to achieve.

The first embodiment of the device of the invention, with the DIN rail or equivalent device, as shown in FIGS. 4A to 5D, calls for 22 connection points. 56 connection points are eliminated. The saving in wiring time in a cabinet for a protection relay may be estimated to be in the range 6 to 8 hours.

The second embodiment of the device of the invention, with "rack" mounting as illustrated in FIGS. 9A to 9D, requires 50 connection points. 28 connection points are eliminated. The saving in wiring time in a cabinet for a protection relay may be estimated to be in the range 3 to 4 hours.

Reduction in the Number of Electrical Connection Points

This reduction assumes even more importance if the following are realized.

An interruption of a current circuit (i.e. the output circuit from a current transformer) poses a danger of electric shock to an operator. Any elimination of a connection point is therefore an improvement in terms of safety.

An interruption of the trip circuit causes the faulty circuit breaker not to be tripped, with serious consequences as to the safety of personnel, damage to the high voltage equipment, and the danger of loss of stability of the electrical network.

If we consider a typical relay receiving current in three phases and voltage in three phases, and having three trip circuits, then:

The prior art arrangement shown in FIG. 1 calls for 78 fixed connection points and 34 sliding connection points (by counting the connections and the points of contact of the test sockets and of the disconnectable base part of the protection relay).

The first embodiment, with a DIN rail, requires 22 fixed connection points (a reduction of 70%), and 20 sliding connection points (a reduction of 41%).

The second embodiment of the device of the invention, with rack mounting, calls for 50 fixed connection points (a reduction of 35%) and 20 sliding connection points (a reduction of 41%).

Live Disconnection Facility

The device of the invention also solves the problem of live disconnection, that is to say the problem of being able to disconnect the protection relay without first taking it off voltage. If no precaution is taken, there clearly exists a risk of a major accidental trip during such a disconnection, due to the opening of the current and voltage circuits, which are not necessarily synchronized with each other. With the device of the invention, during the disconnection operation, the trip circuit, which is carried by the same connector as the connector for the transformers being monitored, is opened before the circuits of these transformers. Any risk of accidental tripping is therefore avoided.

The invention further provides a method of protecting a link in a medium, high, or very high voltage electrical network, with current and voltage transformers and trip circuits being disposed on said link, with the aid of a device that includes connection means for direct connection to a power supply, to the current and voltage transformers, and to the trip circuits via analog links, and further includes analog to digital conversion means connected to a central processor unit via a digital link, the method being characterized in that it includes the following steps, the means for direct connection and the analog to digital conversion means being inserted one into the other:

a step of withdrawing means for direct connection and analog to digital conversion means from each other, in such a way that the trip circuits are first disconnected, the current transformer circuits being subsequently short-circuited and disconnected at the same time as the voltage circuits; and a step of testing by secondary injection of current and voltage after insertion of a test part into the analog to digital conversion means, so as to test them without activating the trip circuits.

In an advantageous mode of operation:

said active part for analog to digital conversion is inserted into a base part that is connected to the supply voltage, to the current and voltage transformers, and to the trip circuits.

said active part is first connected to the central processor unit.

Advantageously, in a testing step:

said active part is extracted from the base part;

the active part is turned round and inserted afresh into the base part; and the test part is fitted on said active part.

Advantageously, when the active part is extracted from the base part, the trip circuits are first interrupted, and the voltage and current transformer circuits are then interrupted, the current circuits also being short-circuited.

BRIEF DESCRIPTION OF THE DRAWINGS

FIG. 1 shows a first protection device in the prior art.

FIGS. 2A and 2B show a second protection device in the prior art.

FIGS. 4A to 5D and 5A to 5D show a first version of a second embodiment of the device of this invention.

DETAILED DESCRIPTION OF PARTICULAR EMBODIMENTS

Figure 3:
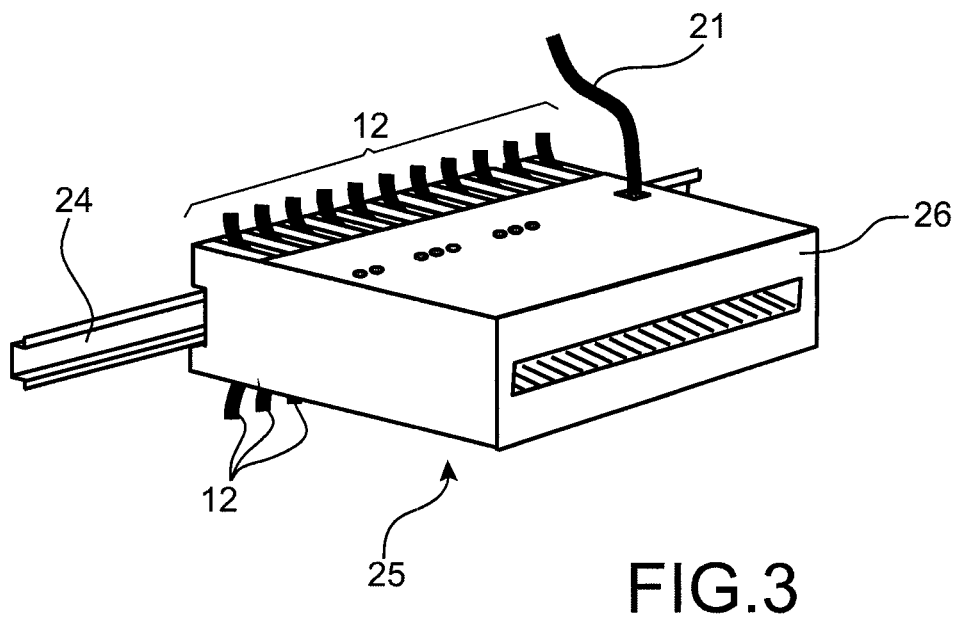
FIG. 3 shows a first embodiment of the device of this invention.

In a first embodiment of the device of the invention, shown in FIG. 3, in order to overcome the problem in the second version of the prior art device described above with reference to FIGS. 2A and 2B, namely the inability to carry out functional testing, the test box is integrated into the decentralized acquisition unit 25 in such a way that it is able to have a "testing by secondary injection" function. The decentralized acquisition unit 25 accordingly has a test box function, with an integrated test box 26. FIG. 3 shows the same analog connectors 12 and digital link 21 as does FIG. 2. Although this first embodiment resolves the functional testing problem, it does not permit an acquisition unit 25 to be replaced if it malfunctions. Such replacement cannot be carried out without shutting down the current and voltage circuits (a tricky operation that requires switching off the voltage to the equipment), because the protection relay is incorporated in the test box. In order to overcome this problem, it is possible to provide a function of disconnecting the current and voltage acquisition unit by itself. However, a disadvantage of such an arrangement is that it involves additional cost and the addition of interface points.

The second embodiment of the device of the invention enables these problems to be overcome.

In a first version, shown in normal operation in FIGS. 4A to 4D and 5A to 5D, it consists of the following:
- a base part 31 fixed to a DIN rail 32 with direct connection, via analog links 38, to the supply voltage, to the current and voltage transformers, and to the trip circuits;
- an active part 30, for performing the analog to digital conversion and having the trip contacts, this part including a digital link 34 connected to a central processor unit that monitors current and voltage and takes the decision whether or not to trip the circuit breaker. The active part 30 may also include a first socket 35 arranged to be inserted, or plugged, into the base part 31. This first socket 35 may be in the form of a contactless socket, so as merely to hold the relay in place during insertion of the test part 40. It may also be equipped with two contacts 36 for recovering the supply voltage of the active part 30, for the purpose of energizing the active part afresh when it is connected in the manner shown in FIG. 4D.

Figure 4A:
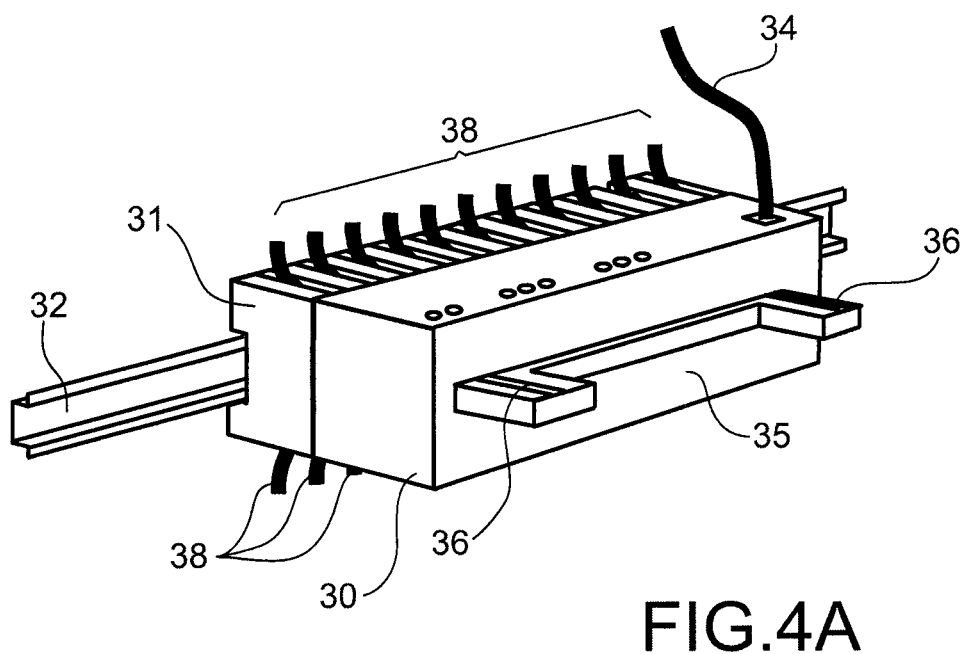
Figure 4B:
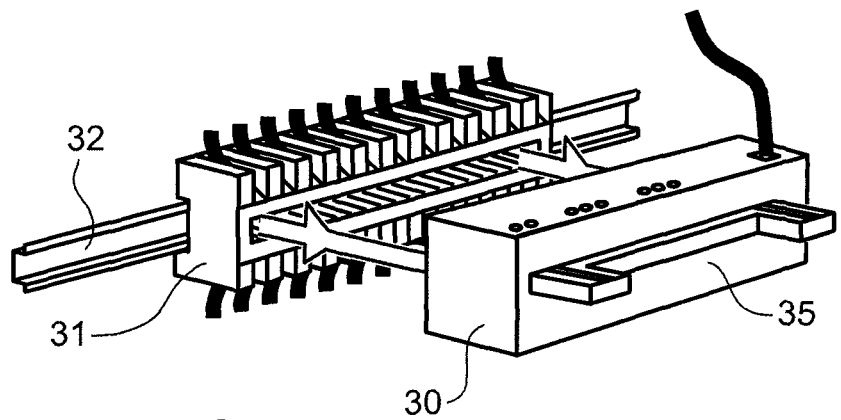

When the active part 30 is disconnected (unplugged) from the base part 31, as shown in FIG. 4B, the trip circuits are disconnected, the continuity of the current circuit is then maintained by these circuits being short-circuited, and then, finally, the current, voltage, and trip circuits are disconnected.

Figure 4C:
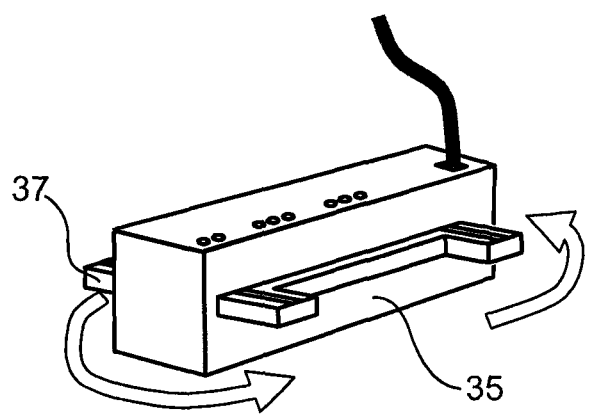
Figure 4D:
Figure 4D:
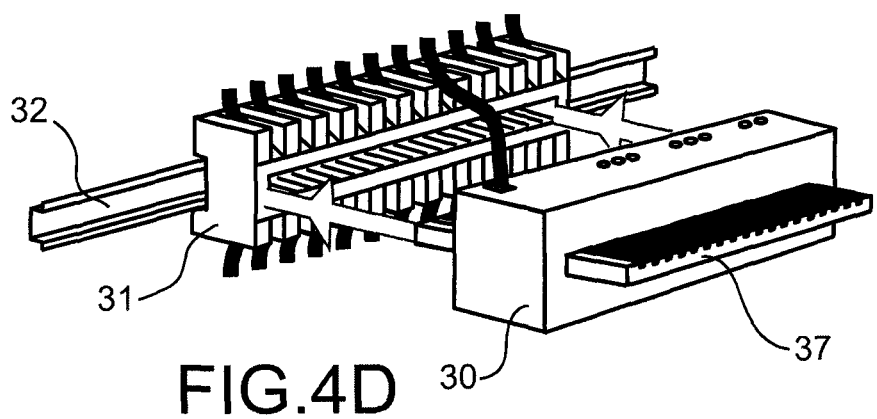

As is illustrated in FIGS. 4C and 4D, once the active part 30 has been withdrawn, it is turned round (see FIG. 4C) and plugged, by its first socket 35, into the base part 31, being now in its testing position. The power supply to the active part 30 is now restored, and the active part 30 is ready to receive the test part 40.

In this test position, the fact that the power supply of the test part is provided by the reconnection of the active part 30 is not essential. It is merely an advantageous variant. The same is true as regards the notion of reconnecting the active part 30 by plugging it again into the base part 31. This reconnection does ensure that the active part 30 is fastened securely in the base part 31 before the test part 40 is added. But again this is only one variant.

The test part 40 in FIGS. 5A to 5D is inserted, and the functional tests can be carried out by secondary injection with the aid of the plugs 45.

Figure 6A:
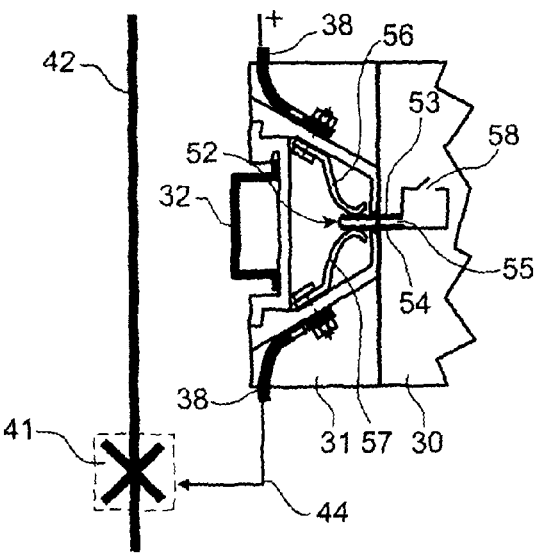
FIGS. 6A to 6C show details of the disconnection of a trip circuit in said first version.
Figure 6B:
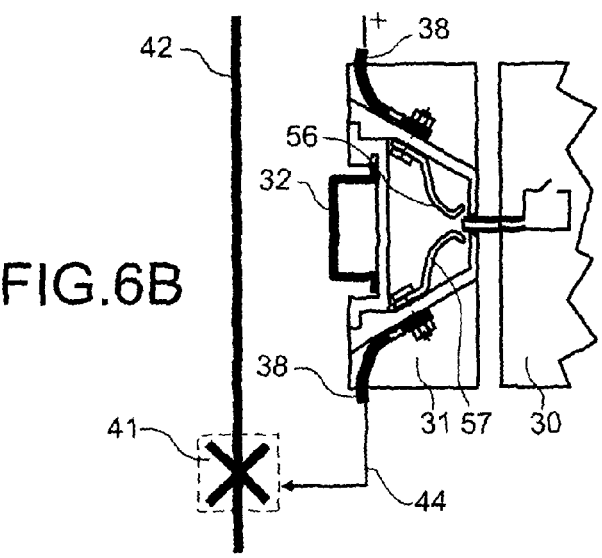
Figure 6C:
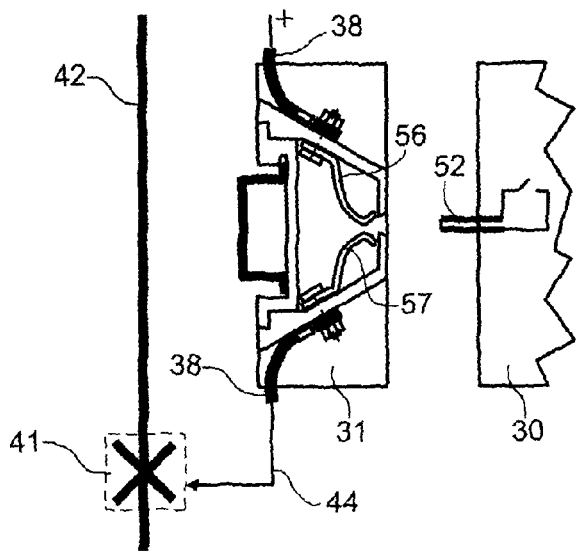

FIGS. 6A to 6C show details of the disconnection of a trip circuit, as illustrated in FIG. 4B, here shown in three positions that are, respectively, the connected position, a middle position, and the disconnected position, of the active part 30 relative to the base part 31, which enables the trip circuit of the circuit breaker 41, disposed on a link 42, to be interrupted, the reference 44 indicating the link with the trip coil of the trip circuit. The trip circuit 44 of the circuit breaker 41 is interrupted first, as shown in FIG. 6B, due to the fact that the plug associated with the trip circuit is shorter than the plugs associated with the current and voltage circuits. This eliminates any risk of accidental tripping of the current and voltage circuits.

More particularly, FIGS. 6A to 6C show a contact pin 52, which comprises a top contact 53 separated from a bottom contact 54 by an insulating intermediate portion 55, the top contact being arranged to engage with a flexible first leaf contact 56, while the bottom contact is arranged to engage with a flexible second leaf contact 57. As is shown in these figures, insertion of the pin into the leaf contacts 56 and 57, or withdrawal of the pin from them, enables the trip circuit to be inserted into or withdrawn from the circuit breaker 41.

Figure 7A:
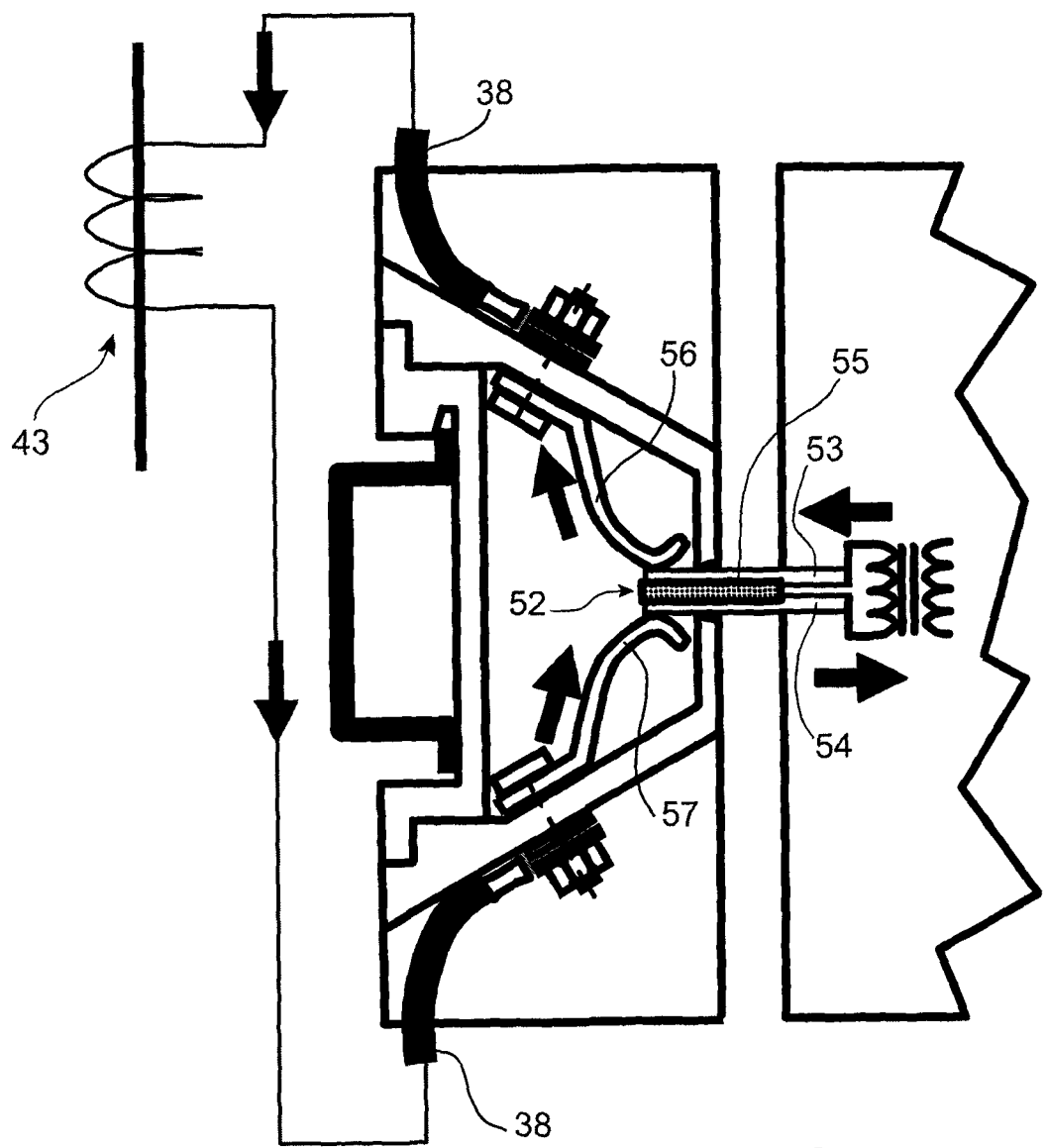
FIGS. 7A to 7C show details of the disconnection of a current circuit in said first version.
Figure 7B:
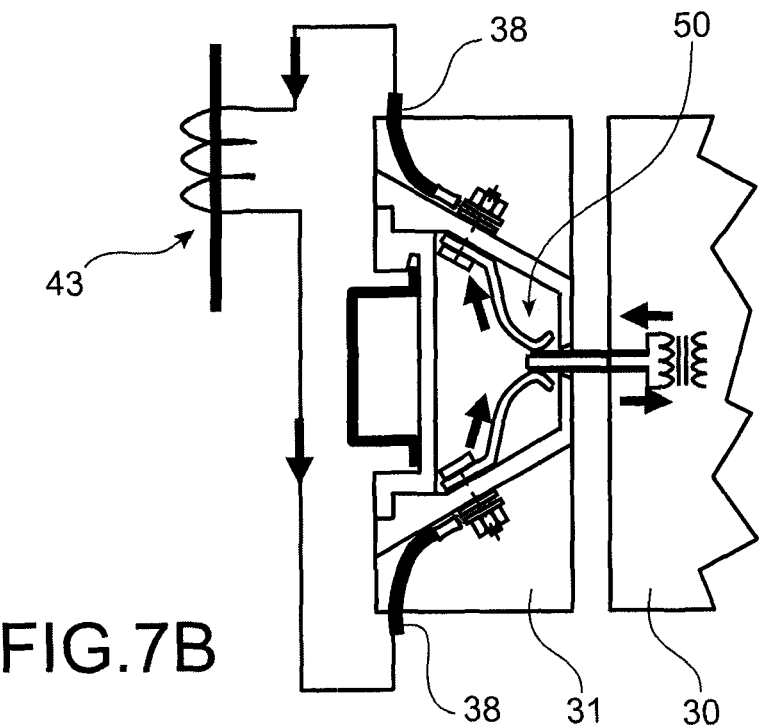
Figure 7C:
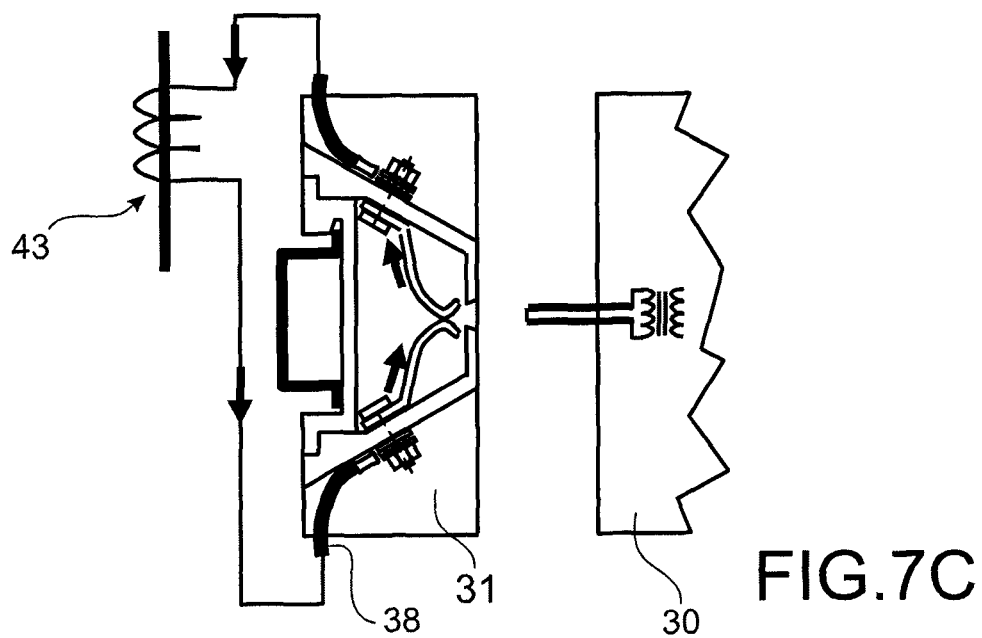

FIGS. 7A to 7C show details of the disconnection of a current circuit 43 in three positions of said current circuit, which are, respectively, the connected position, a middle position and a disconnected position. As indicated by the reference 50, continuity of the circuit is ensured during the disconnection operation, the direction of current flow being indicated by arrows.

Figure 8A:
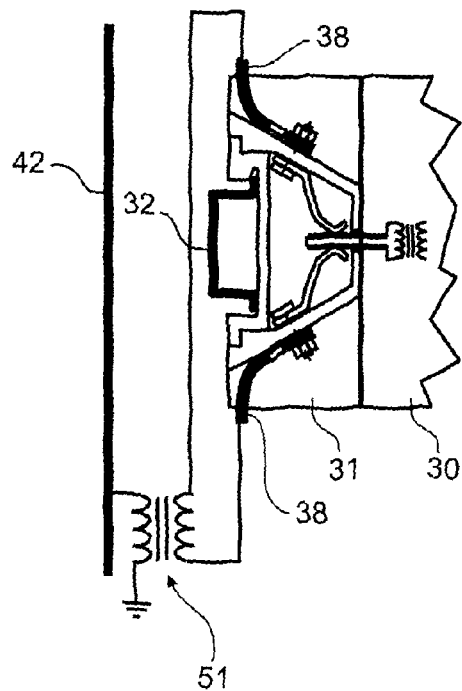
FIGS. 8A to 8C show details of the disconnection of a voltage circuit in said first version.
Figure 8B:
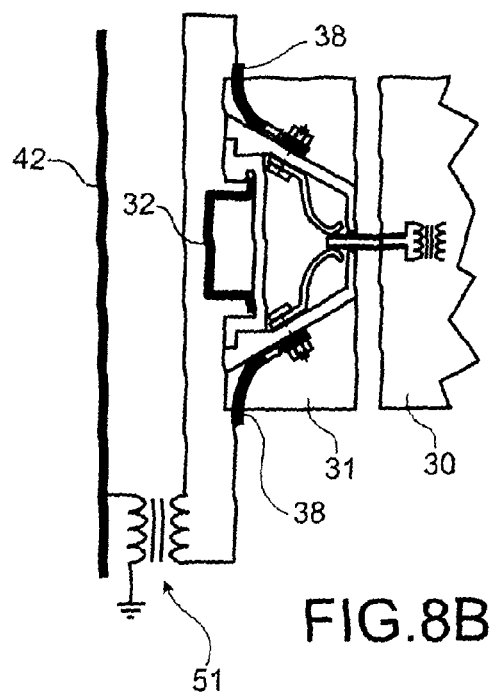
Figure 8C:
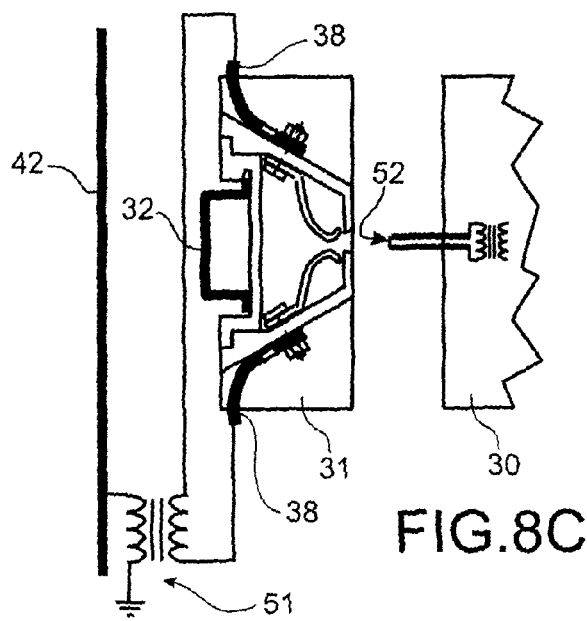

FIGS. 8A to 8C show a detail of the disconnection of a voltage circuit 51, shown in three positions of said voltage circuit, which are, respectively: a connected position, a middle position, and a disconnected position, in the same manner as for the trip circuit shown in FIGS. 6A to 6C. It is however necessary to note that the top and bottom contacts 53 and 54 shown in FIGS. 6A to 6C are shorter than the contacts 53 and 54 shown in FIGS. 7A to 7C and 8A to 8C, so that the first thing that happens when the active part 30 is disconnected is interruption of the trip circuits, the voltage and current transformer circuits being interrupted afterwards, and the current circuit being also short-circuited before disconnection of the part 30.

FIGS. 9A to 9D show a second version, with a relay that is rack mounted.

Figure 9A:
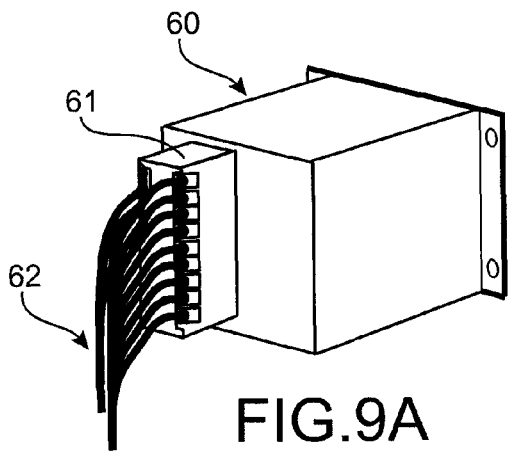
FIGS. 9A to 9D show a second version of the second embodiment of the device of the invention.
Figure 9B:
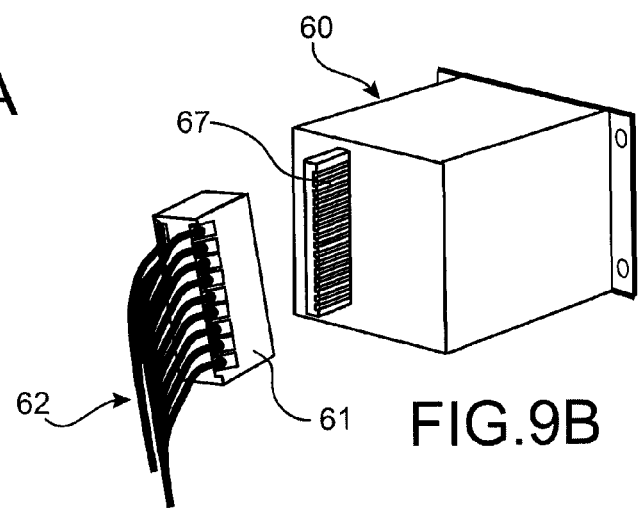

FIGS. 9A and 9B show the link 62 to the current and voltage transformers and trip circuits, from an active part 50 in the form of a rack, through a base part 61 that is fitted on a socket 67 of the active part. Connection to the current and voltage transformers is made through an interface terminal block 75, shown in FIG. 12A.

Figure 9C:
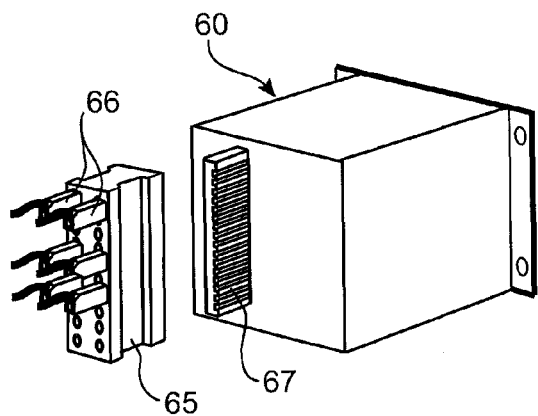
Figure 9D:
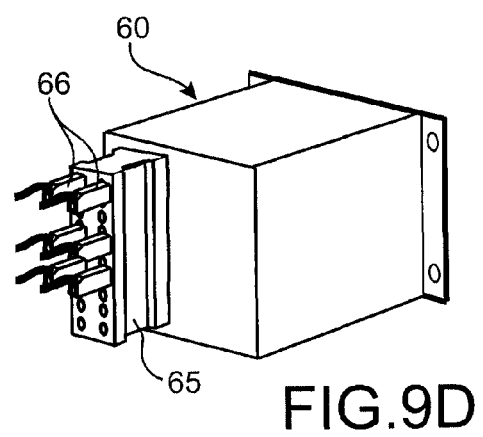

In FIGS. 9C and 9D, a test part 65 is fitted on the socket 67 in place of the base part 61. Plugs 66 are inserted in the test part 65 to enable functional tests to be carried out by direct injection on the current and voltage circuits of the relay.

The device of the invention, in its first and second versions, thus has an active part 30 or 60 that has a plug 35 or 67, on which it is possible to fit:

either a base part 31 or 61 connected to the supply voltage, to the current and voltage transformers, and to the trip circuits when the protection device is in service, said base part being so designed that, when the active part is withdrawn, then the first thing that happens is interruption of the trip circuits, the second event then being that the current transformer circuits are short-circuited and disconnected from the active part, and the voltage transformer circuits are disconnected from the active part;

or a test part 40 or 65, compatible with the socket 37 or 67 of the active part respectively, so that when the base part 31 or 61 is disconnected and the test socket 40 or 65 inserted in its place, current and voltage are injected, by means of plugs 45 or 66, into the active part for testing.

The invention therefore enables a single plug 35 or 67 to be used on the active part 30 or 60 either for the purpose of making a connection of the active part to the base part 31 or 61, with easy and safe disconnection, i.e. neither a risk of involuntary opening of the current transformer circuit nor a risk of accidental tripping, or else to serve as a test socket.

Figure 10A:
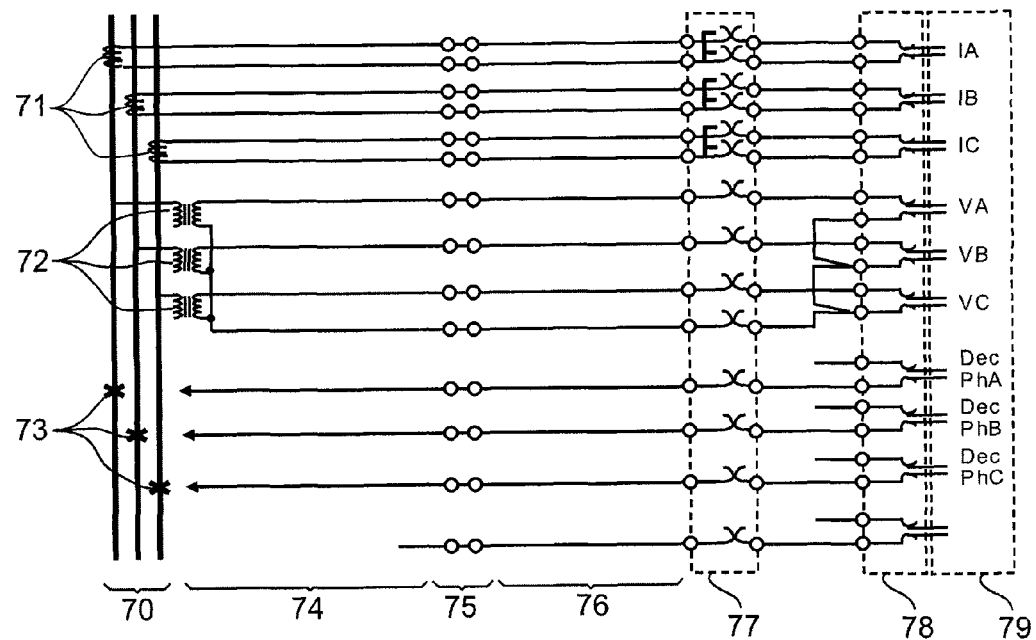
FIGS. 10A and 10B show the electrical circuit of a protection device of the prior art.
Figure 10B:
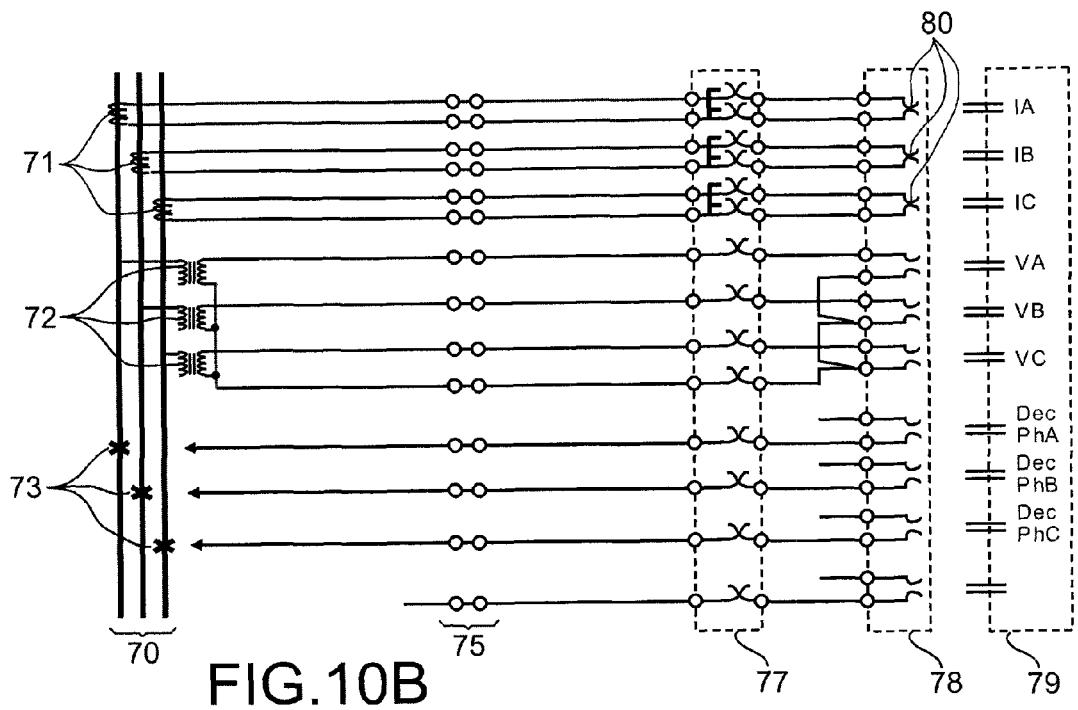

FIGS. 10A and 10B show the circuit of a protection device in the prior art, with the active part (or relay) being shown connected and disconnected respectively. These figures show, in succession:

three high voltage conductors 70 in phases A, B, and C;
three current transformers 71, each of which is disposed on one phase A, B, or C, and can pass a current in the range of, for example, from 3000 amps (A) to 1 A in normal working;
three voltage transformers 72, each of which is disposed on one phase A, B or C, and can pass a voltage in the range of, for example, from 220,000 volts (V) to 100 V;
three high voltage circuit breakers 73, each of which is disposed on one phase A, B, or C;
a low voltage cable 74;
an intermediate terminal block 75;
insulated conductors 76;
a test box 77;
a relay connector 78; and
a relay 79 that enables the currents IA, IB, and IC and voltages VA, VB, and VC to be obtained, and that generates the trip signals for the circuit breakers, namely signals DecPhA, DecPhB and DecPhC, with, for each said signal, a top contact and a bottom contact as described above with reference to FIGS. 6A to 6C. In FIG. 10B, the flexible leaf contacts 80 corresponding to the current circuit are closed together so as to short circuit the current transformers 71.

Figure 11A:
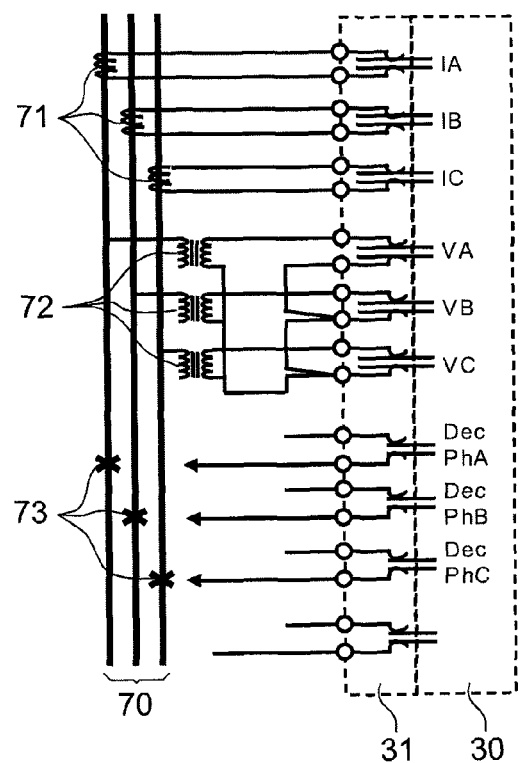
FIGS. 11A to 11E show the electrical circuit of said first version of the device of the invention.

FIGS. 11A to 11E show the circuit of the first version of the device of the invention with a DIN rail, the active part 30 being plugged into the base part 31 as shown in FIG. 4A. In FIG. 11A, it is clearly shown that the contacts of the current and voltage circuits are longer than those of the trip circuits.

Figure 11B:
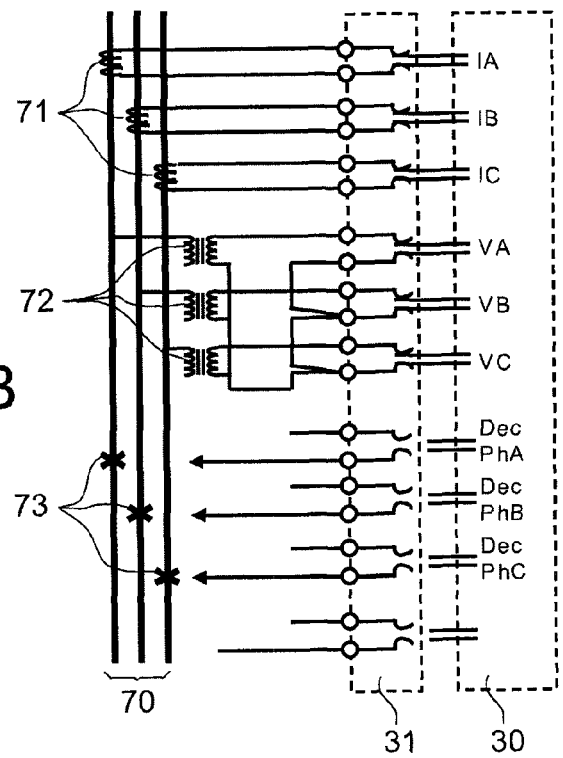
Figure 11C:
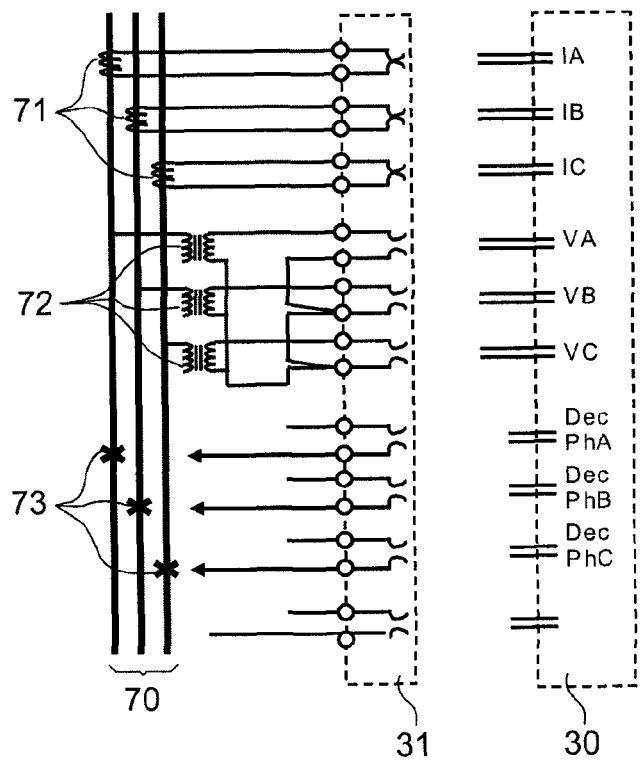

In FIGS. 11B and 11C, the active part 30 is disconnected, partially and totally, as shown in FIG. 4B, the trip circuits being interrupted before the current and voltage circuits.

Figure 5A:
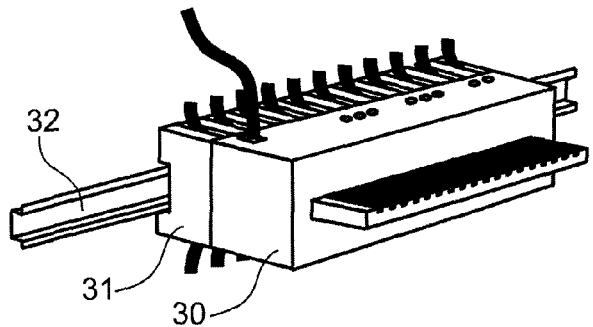
Figure 5B:
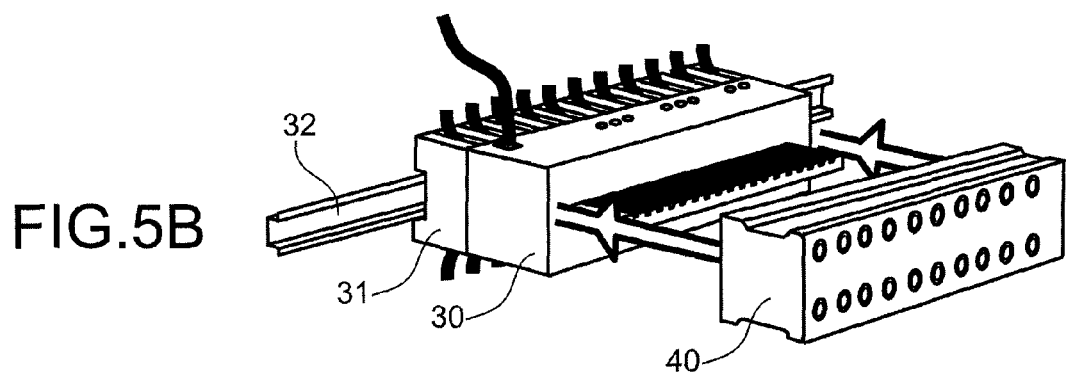
Figure 5C:
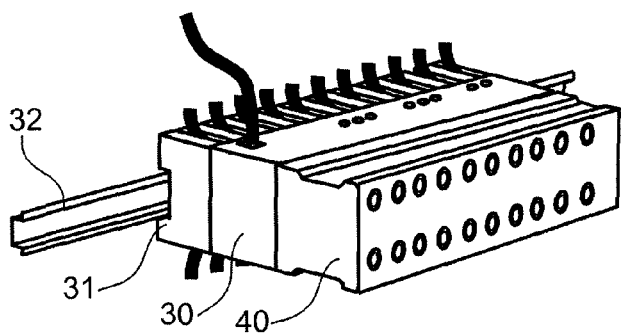
Figure 5D:
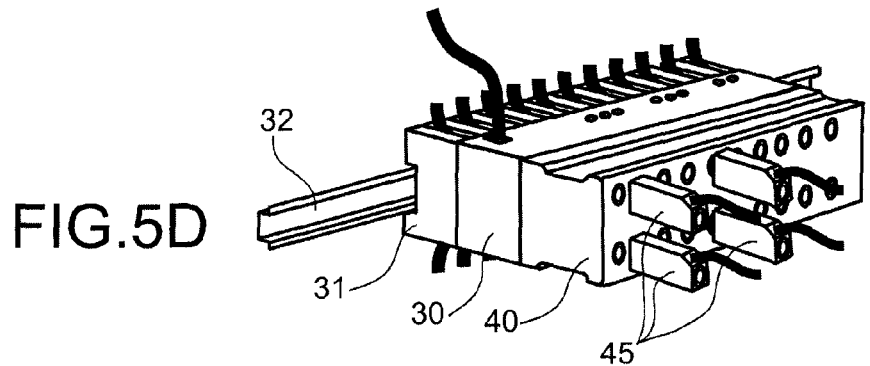
Figure 11D:
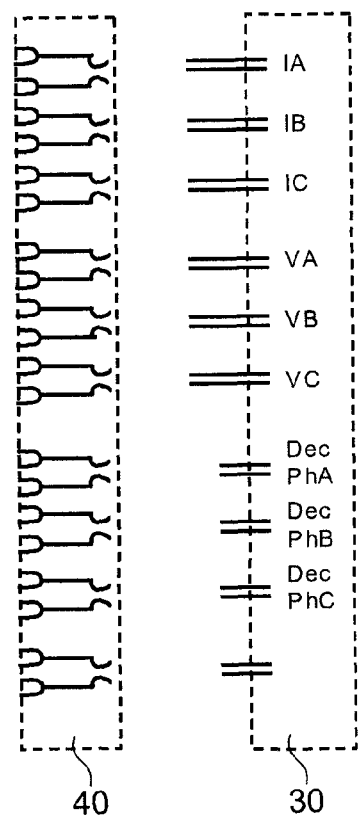
Figure 11E:
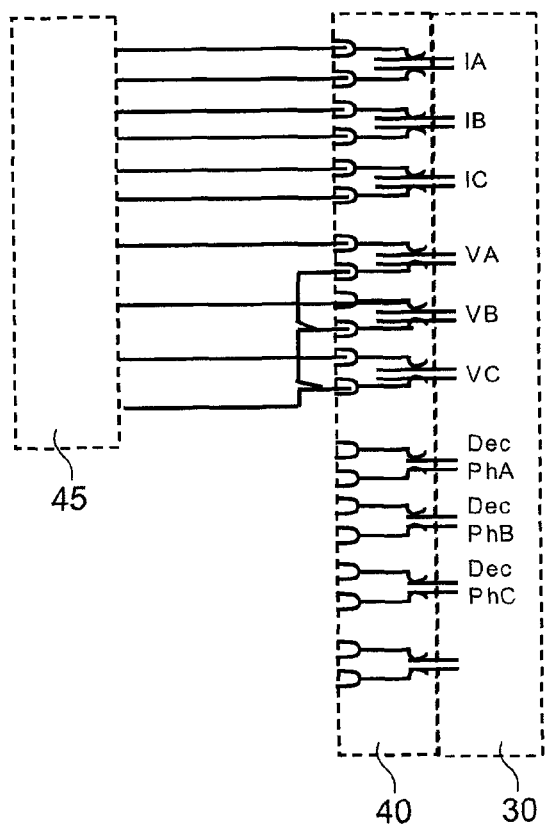

In FIGS. 11D and 11E, the test part 40 is connected (plugged in) as shown in FIGS. 5B and 5C respectively.

Figure 12A:
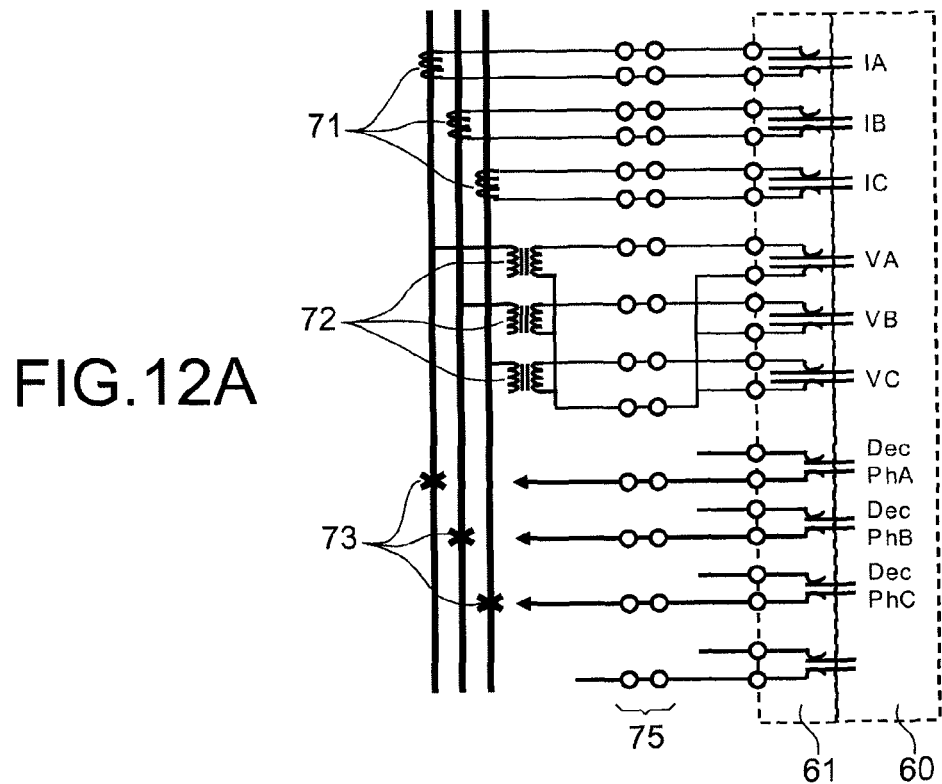
FIGS. 12A to 12E show the electrical circuit of said second version of the device.
Figure 12B:
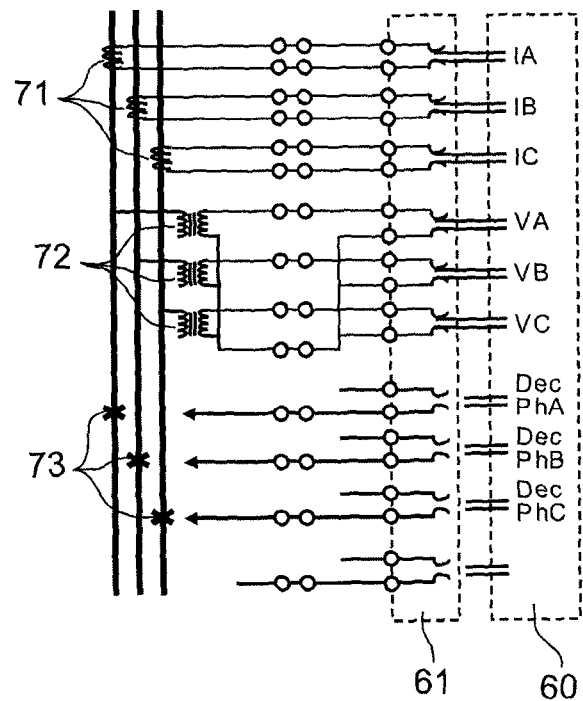
Figure 12C:
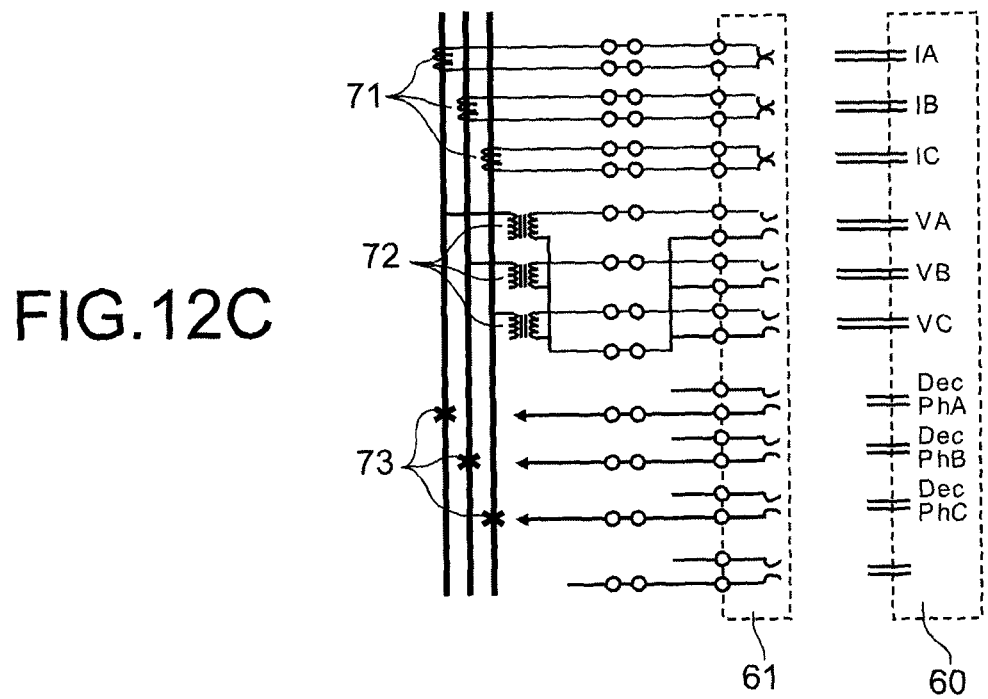
Figure 12D:
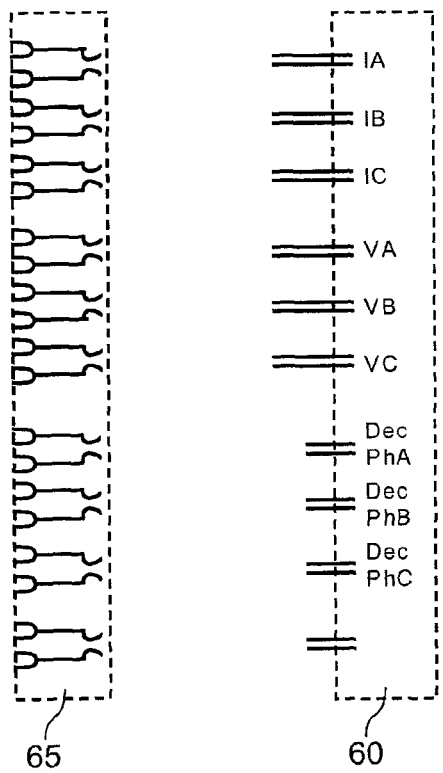
Figure 12E:
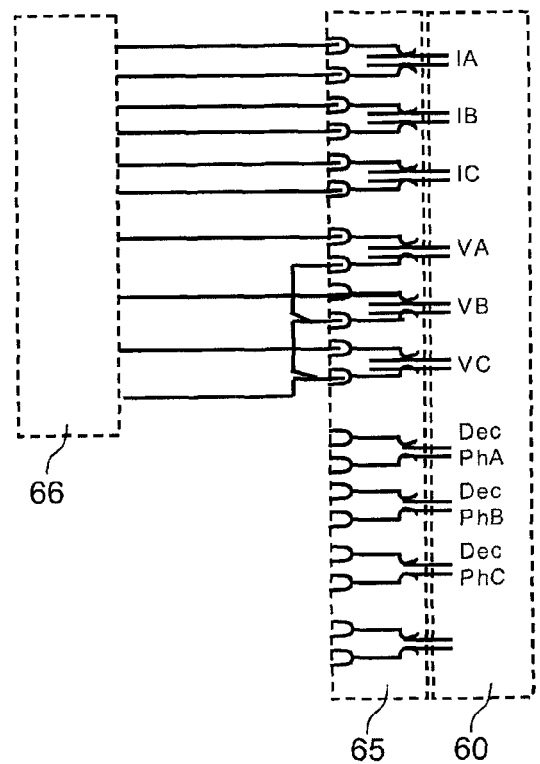

FIGS. 12A to 12E show the circuit of the second version of the device of the invention with rack mounting. In FIG. 12A, the active part is shown connected as shown in FIG. 9A. FIGS. 12B and 12C show the active part partially and totally disconnected as shown in FIG. 10B. In FIGS. 12D and 12E, the test socket 65 is connected as shown in FIGS. 9C and 9D. The comments made above about the lengths of the various contacts also hold true here.

References

[1] FR 2 062 734 or U.S. Pat. No. 3,696,296

The invention claimed is:

1. A device for detecting a fault in a medium, high, or very high voltage electrical network, including at least one medium, high, or very high voltage link, the device comprising:

connection means for direct connection to a power supply, to current and voltage transformers, and to trip circuits disposed on the link, via analog links;
means for continuously measuring current and voltage delivered by the current and voltage transformers;
analog to digital conversion means connected to a central processor unit, via a digital link, which central processor unit monitors the current and voltage delivered by the current and voltage transformers;
means for controlling the trip circuits;
means for testing operation by injecting current and voltage;
a base part including a direct connection via analog links to supply voltage, to the current and voltage transformers, and to the trip circuits;
an active part, for performing the analog to digital conversion, including at least one socket and being adapted to be inserted in the base part; and
a test part for enabling current and voltage to be injected and configured to be inserted in a socket of the active part.

2. A device according to claim 1, wherein the active part is connected to the central processor unit via a digital link.

3. A device according to claim 1, wherein the central unit is integrated in the active part.

4. A device according to claim 1, wherein the socket is a contactless socket.

5. A device according to claim 1, wherein the socket includes two contacts for sharing the supply voltage available on the base part for powering the active part.

6. A device according to claim 1, further comprising plugs adapted to be inserted in the test part.

7. A device according to claim 1, wherein the base part is fixed to a DIN rail or to any known fastening system.

8. A device according to claim 1, wherein the active part is rack-mounted or housed inside a metal panel of a front face of a cabinet.

9. A device according to claim 1, wherein the link is a three-phase link with a current transformer, a voltage transformer, and a trip circuit being disposed in each phase.

10. A method of detecting a fault in a medium, high, or very high voltage electrical network, including at least one medium, high, or very high voltage link, by a device including:

connection means for direct connection to a power supply, to current and voltage transformers, and to trip circuits disposed on such a link, via analog links;
means for continuously measuring current and voltage delivered by the current and voltage transformers;
analog to digital conversion means connected to a central processor unit, via a digital link, which central processor unit monitors the current and voltage delivered by the current and voltage transformers;
means for controlling the trip circuits; and
means for testing operation by injecting current and voltage;

the means for direct connection and the analog to digital conversion means being inserted one into the other, the method comprising:

withdrawing a means for direct connection and an analog to digital conversion means from each other, such that the trip circuits are first disconnected, the current transformer circuits being subsequently short-circuited and disconnected at a same time as the voltage transformer circuits; and testing by secondary injection of current and voltage after insertion of a test part into the analog to digital conversion means, so as to test them without activating the trip circuits.

11. A method according to claim 10, further comprising:
inserting an active part for analog to digital conversion into a base part that is connected to the supply voltage, to the current and voltage transformers, and to the trip circuits.

12. A method according to claim 11, wherein the active part is previously connected to the central processor unit.

13. A method according to claim 11, wherein, in the testing:
the active part is extracted from the base part; and
the test part is inserted in the active part.

14. A method according to claim 13, wherein the active part is turned around and inserted afresh into the base part.

15. A method according to claim 11, wherein, when the active part is extracted from the base part, the trip circuits are first interrupted, and the voltage and current transformer circuits are then interrupted.

* * * * *